United States Patent
Bankovic et al.

(10) Patent No.: US 11,480,239 B2
(45) Date of Patent: Oct. 25, 2022

(54) TOOLING AND METHOD FOR FABRICATING HELICAL SECTOR GEAR AND RELATED HELICAL SECTOR GEAR

(71) Applicant: AMERICAN AXLE & MANUFACTURING, INC., Detroit, MI (US)

(72) Inventors: Daniel R. Bankovic, Kersey, PA (US); Douglas Hanes, Dubois, PA (US); Martin J. Fannin, Ridgway, PA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 179 days.

(21) Appl. No.: 16/718,241

(22) Filed: Dec. 18, 2019

(65) Prior Publication Data

US 2020/0217408 A1    Jul. 9, 2020

Related U.S. Application Data

(60) Provisional application No. 62/789,563, filed on Jan. 8, 2019.

(51) Int. Cl.
| | | |
|---|---|---|
| *B22F 5/00* | (2006.01) |
| *F16H 55/17* | (2006.01) |
| *B22F 3/03* | (2006.01) |
| *B22F 5/08* | (2006.01) |
| *B23F 9/10* | (2006.01) |
| *B23F 21/12* | (2006.01) |

(52) U.S. Cl.
CPC ............... *F16H 55/17* (2013.01); *B22F 3/03* (2013.01); *B22F 5/085* (2013.01); *B23F 9/10* (2013.01); *B23F 21/12* (2013.01); *B22F 2003/031* (2013.01)

(58) Field of Classification Search
CPC .... B22F 3/00; B22F 3/004; B22F 3/03; B22F 3/10; B22F 3/12; B22F 3/14; B22F 5/00; B22F 5/004; B22F 5/08; B22F 5/085
See application file for complete search history.

(56) References Cited

U.S. PATENT DOCUMENTS

| | | | |
|---|---|---|---|
| 3,327,548 A * | 6/1967 | Welch ................. | F16H 55/0886 74/410 |
| 5,012,691 A * | 5/1991 | Bertot ..................... | B29C 33/44 249/59 |
| 5,366,363 A | 11/1994 | Good et al. | |
| 6,165,400 A * | 12/2000 | Hinzmann ................ | B22F 5/08 264/120 |
| 2009/0101104 A1 | 4/2009 | Baasch et al. | |

* cited by examiner

*Primary Examiner* — Joseph S Del Sole
*Assistant Examiner* — Thu-Khanh T. Nguyen
(74) *Attorney, Agent, or Firm* — Burris Law, PLLC

(57) ABSTRACT

A helical sector gear having a body and a gear segment having a plurality of helical teeth. The gear segment has a toothed sector, on which all of the helical teeth are formed, and spacing segments on the opposite circumferential ends of the toothed sector. Each of the spacing segments has a circumferential surface, which is longer than a pitch of the helical teeth, and a radial surface that is formed in a helical manner that conforms to the helix angle of helical teeth. A die set for forming the helical sector gear and a related method are also provided.

6 Claims, 8 Drawing Sheets

TOOLING AND METHOD FOR FABRICATING HELICAL SECTOR GEAR AND RELATED HELICAL SECTOR GEAR

CROSS-REFERENCE TO RELATED APPLICATIONS

This application claims the benefit of U.S. Provisional Patent Application No. 62/789,563 filed Jan. 8, 2019, the disclosure of which is incorporated by reference as if fully set forth in detail herein.

FIELD

The present disclosure relates to tooling and a method for fabricating a helical sector gear, as well as a related helical sector gear.

BACKGROUND

This section provides background information related to the present disclosure which is not necessarily prior art.

Helical gears are known in the art and are commonly formed of powdered metal in a process that compacts the powdered metal in a die between an upper punch assembly and a lower punch assembly. To provide uniform compaction of the powdered metal, both the upper and lower punch assemblies travel into the die when the powdered metal is compacted. Due to the helical configuration of the teeth of the helical gear, it is necessary that both the upper and lower punch assemblies be able to rotate about the rotational axis of the helical gear. In this regard, a bearing can be mounted between each of the upper and lower punch assemblies and an associated ram to permit male helical teeth formed on the upper and lower punch assemblies to be guided by or follow female helical teeth formed in the die.

Helical sector gears are known in the art and have a circumferential segment of helical teeth. The helical teeth at the opposite circumferential ends of the helically toothed segment do not typically extend over the entire thickness of the helical sector gear as they intersect a leading or trailing edge of the circumferential segment. Consequently, helical sector gears have heretofore been formed in a machining operation, such as milling or hobbing.

SUMMARY

This section provides a general summary of the disclosure, and is not a comprehensive disclosure of its full scope or all of its features.

In one form, the present disclosure provides a helical sector gear that includes a sector gear body, which is disposed about a central axis, and a gear segment having a plurality of helical teeth. The gear segment is coupled to the sector gear body and extends radially therefrom. The gear segment has a first spacing segment, a second spacing segment and a toothed sector that is disposed circumferentially between the first and second spacing segments and on which all of the helical teeth are formed. Each of the helical teeth extends over a predetermined width of the gear segment and has a root that is spaced radially from the central axis by a predetermined root dimension. The first spacing segment consists of a first helical land having a first circumferential surface and a first radial surface. The first circumferential surface extends radially from the central axis by a first dimension. The first radial surface extends radially between the sector gear body and the first circumferential surface. The first radial surface has a first helical contour that conforms to a helix angle of the helical teeth. The second spacing segment consists of a second helical land having a second circumferential surface and a second radial surface. The second circumferential surface extends radially from the central axis by a second dimension. The second radial surface extends radially between the sector gear body and the second circumferential surface. The second radial surface has a second helical contour that conforms to the helix angle of the helical teeth.

In another form, the present disclosure provides a die set for forming a helical sector gear. The die set includes a die, an upper punch assembly and a lower punch assembly. The die has a die cavity with an interior circumferential die surface that is disposed about a central axis. The interior circumferential die surface is configured to form an exterior circumferential surface of the helical sector gear. The interior circumferential die surface includes a first die spacing segment, a second die spacing segment and a toothed die sector. The toothed die sector is disposed circumferentially between the first and second die spacing segments and defines a plurality of helical die teeth. Each of the helical die teeth extends over a width of the die and has a root that is spaced radially from the central axis by a predetermined root dimension. The first die spacing segment consists of a first helical die land having a first circumferential die surface and a first radial die surface. The first circumferential die surface extends radially from the central axis by a first dimension. The first radial die surface extends radially inward from the first circumferential die surface and has a first helical die contour that conforms to a helix angle of the helical die teeth. The second die spacing segment consists of a second helical die land having a second circumferential die surface and a second radial die surface. The second circumferential die surface extends radially from the central axis by a second dimension. The second radial die surface extends radially inward from the second circumferential die surface. The second radial die surface has a second helical die contour that conforms to the helix angle of the helical die teeth. The upper punch assembly is configured to mate with the die to form a first axial end of the helical sector gear. The upper punch assembly has a first upper punch spacing segment, which is configured to matingly engage with the first die spacing segment, a second upper punch spacing segment, which is configured to matingly engage with the second die spacing segment, and a toothed upper punch sector that is configured to matingly engage the toothed die sector. The lower punch assembly is configured to mate with the die to form a second axial end of the helical sector gear. The lower punch assembly has a gear tooth compacting portion with a first lower punch spacing segment, which is configured to matingly engage with the first die spacing segment, a second lower punch spacing segment, which is configured to matingly engage with the second die spacing segment, and a toothed lower punch sector that is configured to matingly engage the toothed die sector. One of the die, the upper punch assembly and the gear compacting portion is non-rotatable about the central axis, while the other two of the die, the upper punch assembly and the gear compacting portion are rotatable about the central axis.

In still another form, the present disclosure provides a method for forming a helical sector gear. The method includes: providing a die having a die cavity with an interior circumferential die surface that is disposed about a central axis, the interior circumferential die surface being configured to form an exterior circumferential surface of the helical sector gear, the interior circumferential die surface including a first die spacing segment, a second die spacing segment and a toothed die sector, the toothed die sector being disposed circumferentially between the first and second die spacing segments and defining a plurality of helical die teeth, each of the helical die teeth extending over a width of the die and having a root that is spaced radially from the central axis by a predetermined root dimension, the first die spacing segment consisting of a first helical die land having a first circumferential die surface and a first radial die surface, the first circumferential die surface extending radially from the central axis by a first dimension, the first radial die surface extending radially inward from the first circumferential die surface, the first radial die surface having a first helical die contour that conforms to a helix angle of the helical die teeth, the second die spacing segment consisting of a second helical die land having a second circumferential die surface and a second radial die surface, the second circumferential die surface extending radially from the central axis by a second dimension, the second radial die surface extending radially inward from the second circumferential die surface, the second radial die surface having a second helical die contour that conforms to the helix angle of the helical die teeth; providing an upper punch assembly that is configured to mate with the die to form a first axial end of the helical sector gear, the upper punch assembly having a first upper punch spacing segment, which is configured to matingly engage with the first die spacing segment, a second upper punch spacing segment, which is configured to matingly engage with the second die spacing segment, and a toothed upper punch sector that is configured to matingly engage the toothed die sector; providing a lower punch assembly that is configured to mate with the die to form a second axial end of the helical sector gear, the lower punch assembly having a gear tooth compacting portion with a first lower punch spacing segment, which is configured to matingly engage with the first die spacing segment, a second lower punch spacing segment, which is configured to matingly engage with the second die spacing segment, and a toothed lower punch sector that is configured to matingly engage the toothed die sector; loading the die cavity with a predetermined amount of a powdered metal material; and compacting the powdered metal material in the die cavity between the upper punch assembly and the lower punch assembly, wherein one of the die, the upper punch assembly and the gear compacting portion is non-rotatable about the central axis when the powdered metal material is compacted in the die, and wherein the other two of the die, the upper punch assembly and the gear compacting portion are rotatable about the central axis when the powdered metal material is compacted in the die.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
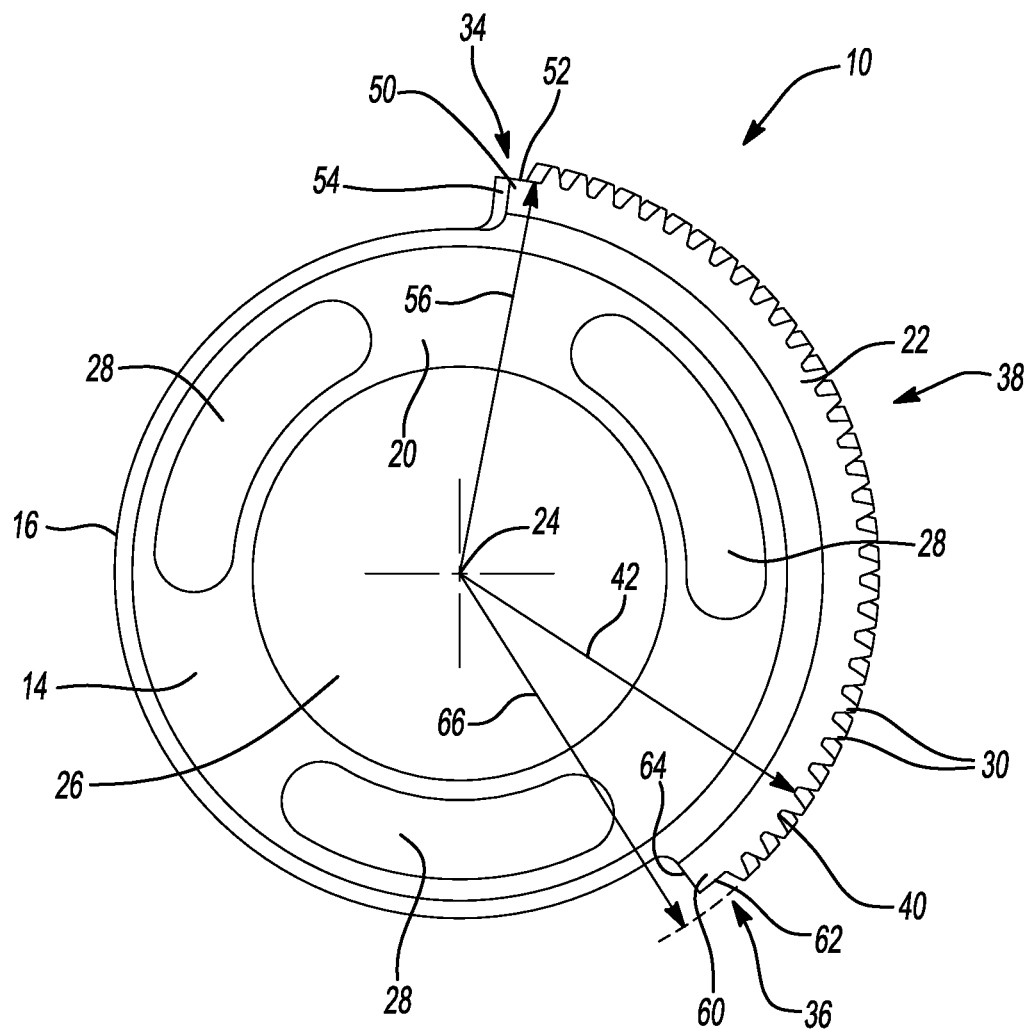
FIG. 1 is a bottom plan view of an exemplary helical sector gear constructed in accordance with the teachings of the present disclosure.
Figure 2:
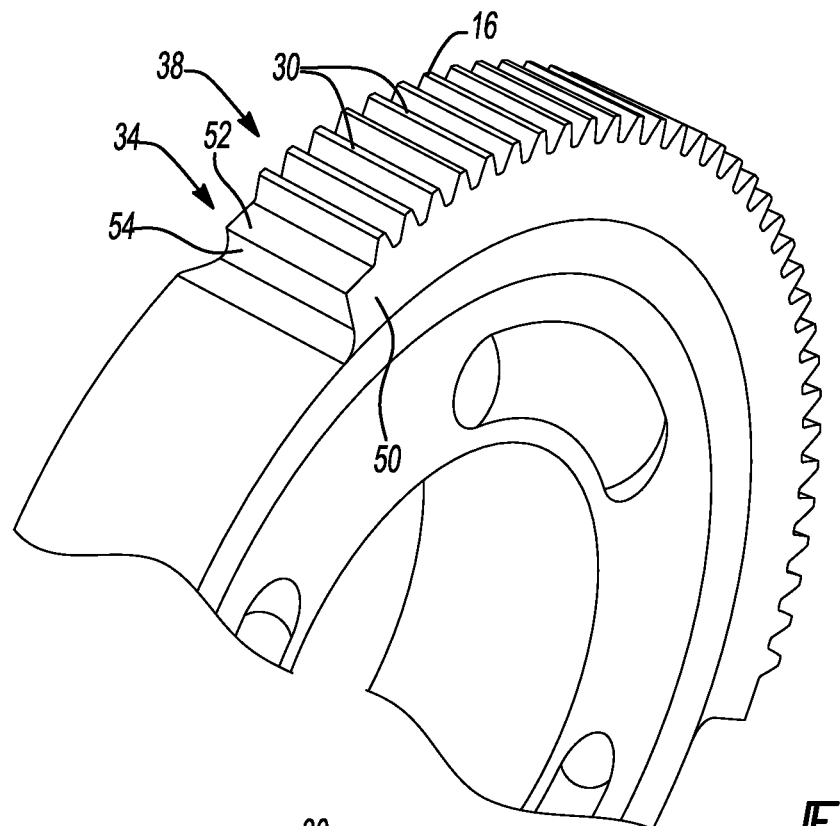
FIGS. 2 and 3 are perspective views of portions of the helical sector gear of FIG. 1 illustrating first and second spacing segments formed on a gear segment in greater detail.
Figure 3:
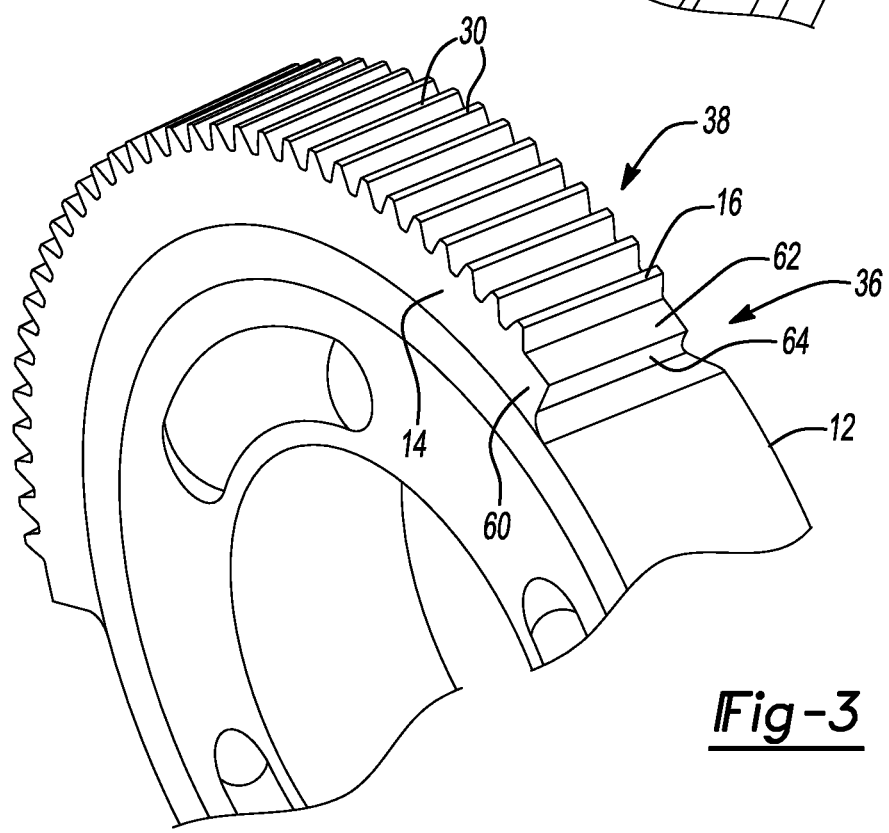

With reference to FIGS. 1 through 3 of the drawings, an exemplary helical sector gear constructed in accordance with the teachings of the present disclosure is generally indicated by reference numeral 10. The helical sector gear 10 has a first axial side 12, a second axial side 14 and an exterior circumferential surface 16. The helical sector gear 10 can include a sector gear body 20 and a gear segment 22. The sector gear body 20 can be disposed about a central axis 24 and can define a central aperture 26. The central aperture 26 is depicted as being a round hole in the example provided, but it will be appreciated that the central aperture 26 could be formed differently (e.g., a square, hexagonal or internally toothed or splined hole). Optionally, a plurality of circumferentially extending grooves 28 can be formed into one of axial sides of the sector gear body 20. The circumferentially extending grooves 28 can be spaced circumferentially apart from one another and can be configured as part of a ball-ramp actuator (not shown) in which one or more bearing balls are disposed in each of the circumferentially extending grooves 28.

The gear segment 22, which has a plurality of helical teeth 30, can be coupled to the sector gear body 20 in any desired manner and can extend radially therefrom. In the example provided, the gear segment 22 is integrally and unitarily formed with the sector gear body 20 from a suitable material, such as a powdered metal material that has been consolidated. The gear segment 22 has a first spacing segment 34, a second spacing segment 36 and a toothed sector 38 that is disposed circumferentially between the first and second spacing segments 34 and 36 and on which all of the helical teeth 30 are formed. Each of the helical teeth 30 extends over a predetermined width of the gear segment 22 and has a root 40 that is spaced radially from the central axis 24 by a predetermined root dimension 42.

The first spacing segment 34 consists of a first helical land 50 having a first circumferential surface 52 and a first radial surface 54. The first circumferential surface 52 extends radially from the central axis 24 by a first dimension 56. In the example shown, the first dimension 56 is less than or equal to the predetermined root dimension 42, but it will be appreciated that the first dimension 56 could be different from that which is shown. For example, the first dimension 56 could be equal to the outer radius of the helical teeth 30 (i.e., a distance between the central axis 24 and a top land of one of the helical teeth 30). The first circumferential surface 52 has a (circumferential) length that is greater than or equal to a pitch of the helical teeth 30. The first radial surface 54 extends radially between the sector gear body 20 and the first circumferential surface 52. The first radial surface 54 has a first helical contour (i.e., a flat plane warped in a helical manner) that conforms to a helix angle of the helical teeth 30.

The second spacing segment 36 consists of a second helical land 60 having a second circumferential surface 62 and a second radial surface 64. The second circumferential surface 62 extends radially from the central axis 24 by a second dimension 66. In the example shown, the second dimension 66 is less than or equal to the predetermined root dimension 42, but it will be appreciated that the second dimension 66 could be different from that which is shown. For example, the second dimension 66 could be equal to the outer radius of the helical teeth 30 (i.e., a distance between the central axis 24 and a top land of one of the helical teeth 30). The second circumferential surface 62 has a (circumferential) length that is greater than or equal to a pitch of the helical teeth 30. The second radial surface 64 extends radially between the sector gear body 20 and the second circumferential surface 62. The second radial surface 64 has a second helical contour (i.e., a flat plane warped in a helical manner) that conforms to the helix angle of the helical teeth 30.

Figure 4:
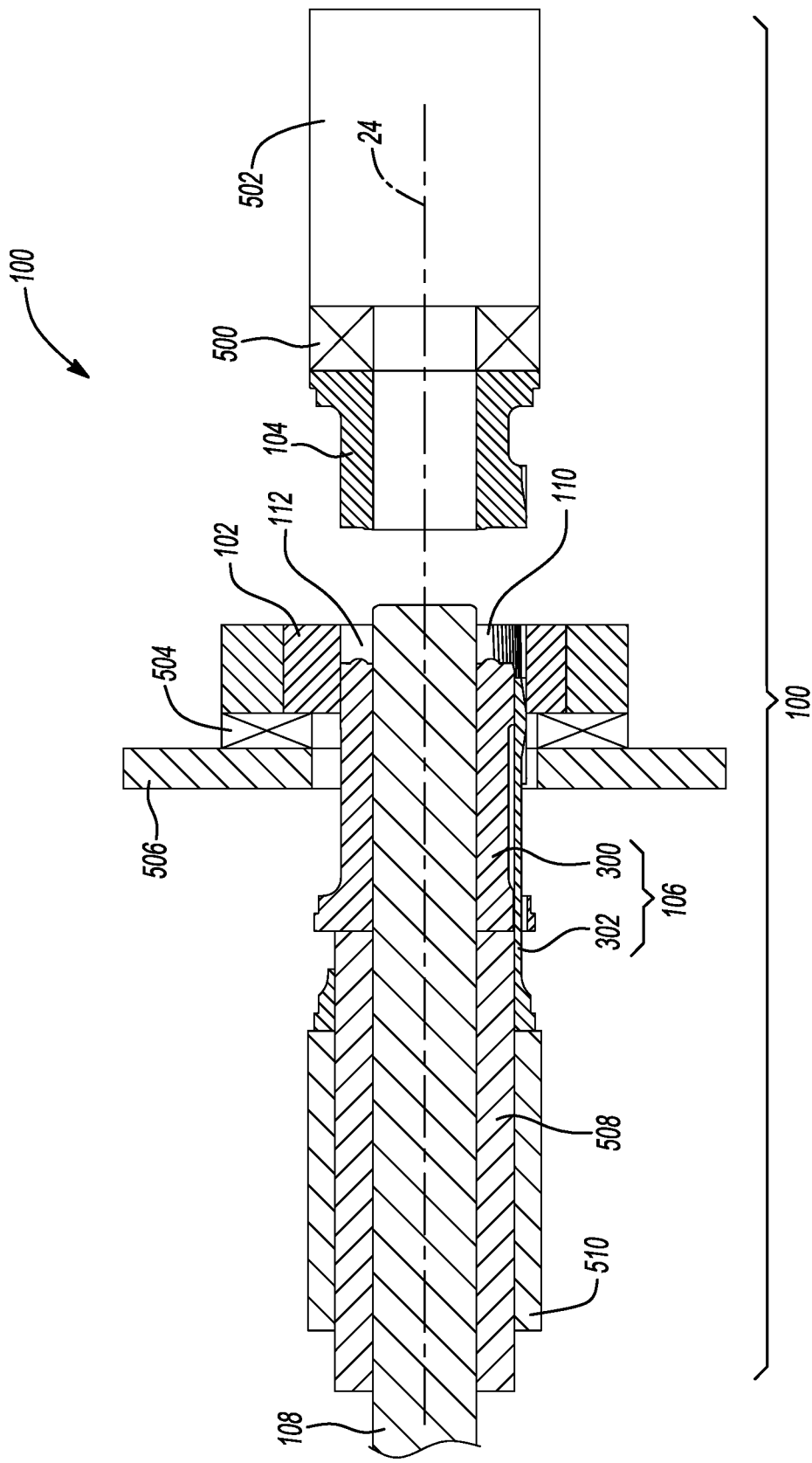
FIG. 4 is a section view of an exemplary die set constructed in accordance with the teachings of the present disclosure, the die set being configured to form the helical sector gear of FIG. 1 and shown schematically with associated rams and bearings.
Figure 5:
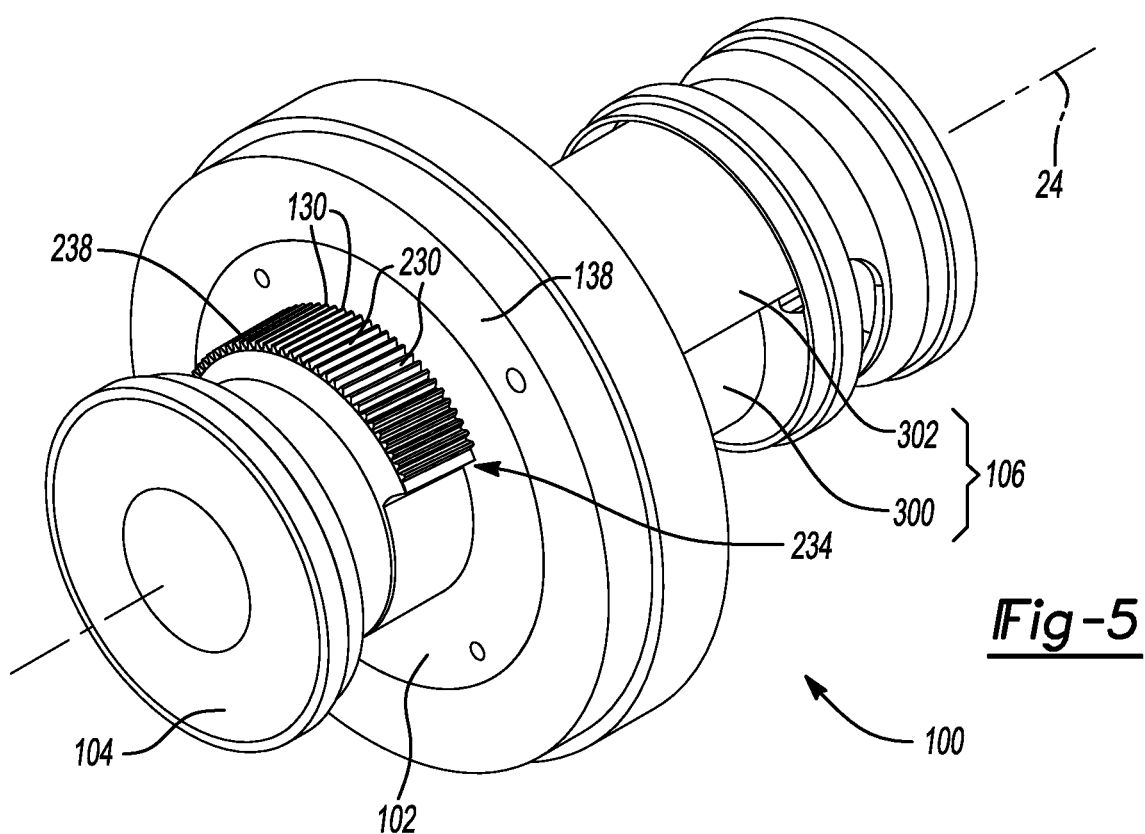
FIGS. 5 and 6 are top and bottom perspective views of the die set of FIG. 4.
Figure 6:
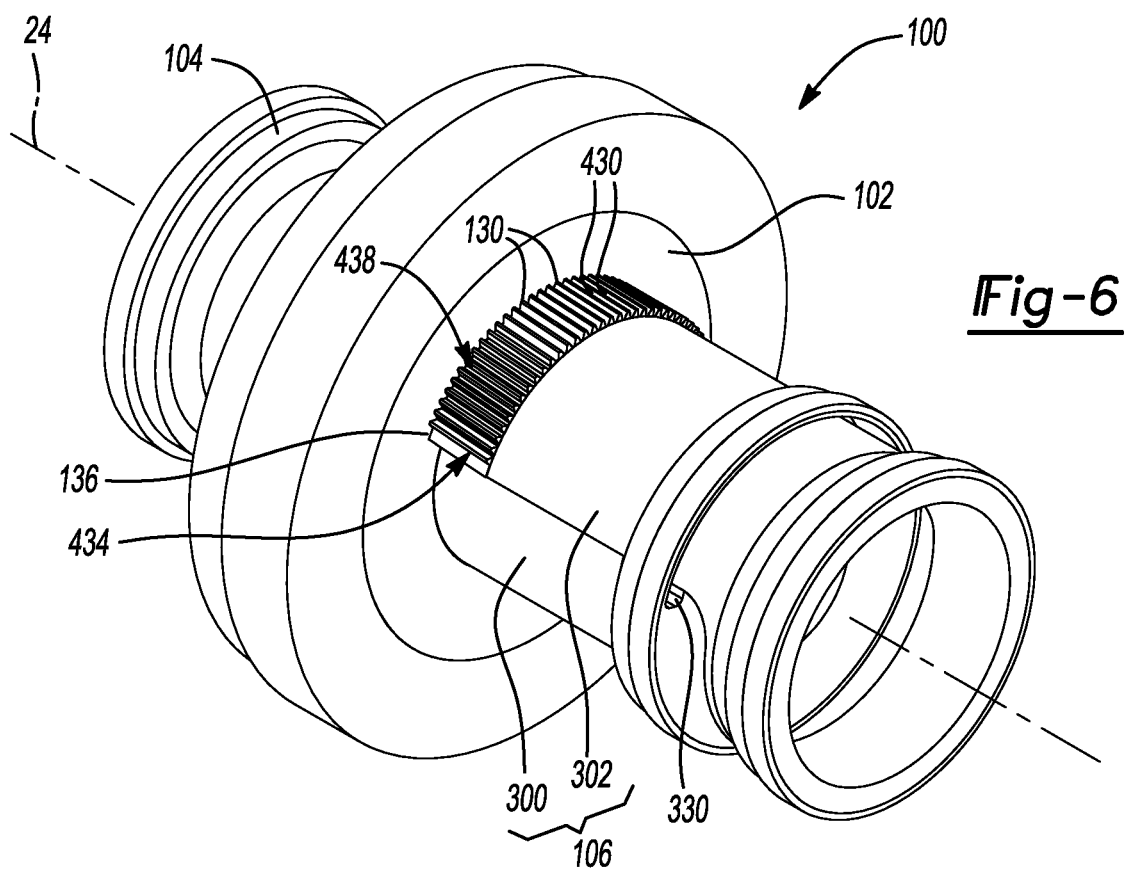

With reference to FIGS. 4 through 6, an exemplary die set for forming the helical sector gear of FIG. 1 is generally indicated by reference numeral 100. The die set 100 includes a die 102, an upper punch assembly 104, a lower punch assembly 106, and optionally a core rod 108.

Figure 7:
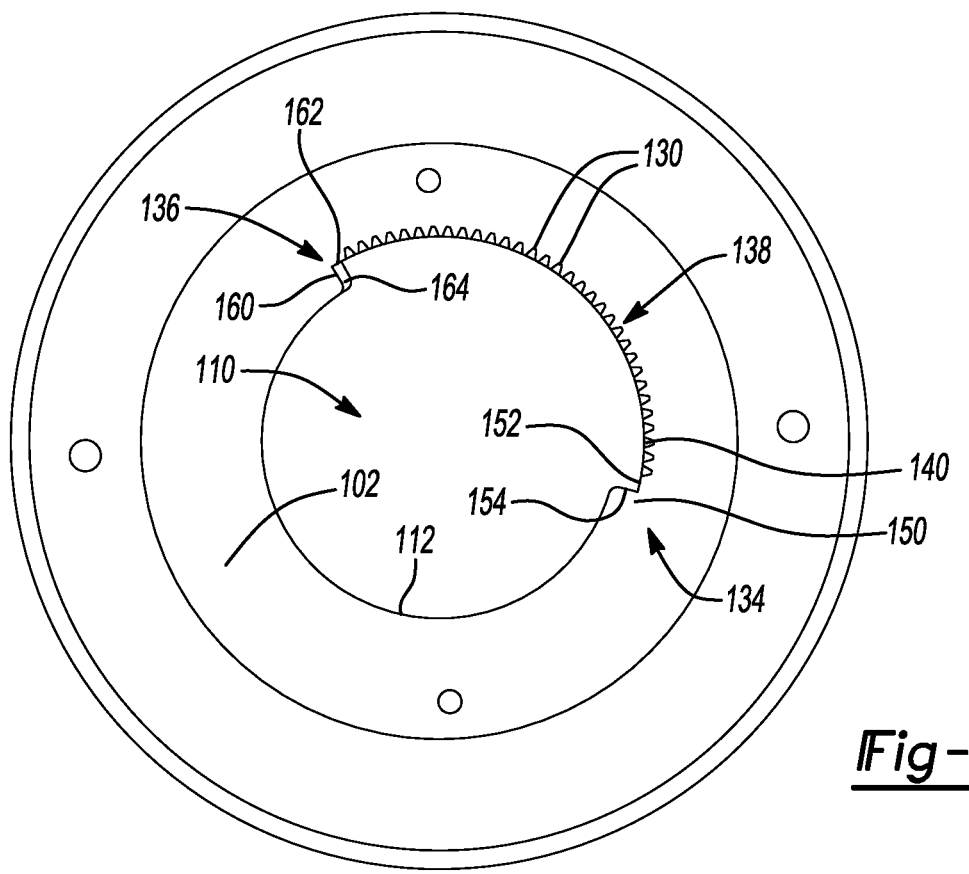
FIG. 7 is a top plan view of a portion of the die set of FIG. 4, the view illustrating a die in greater detail.
Figure 8:
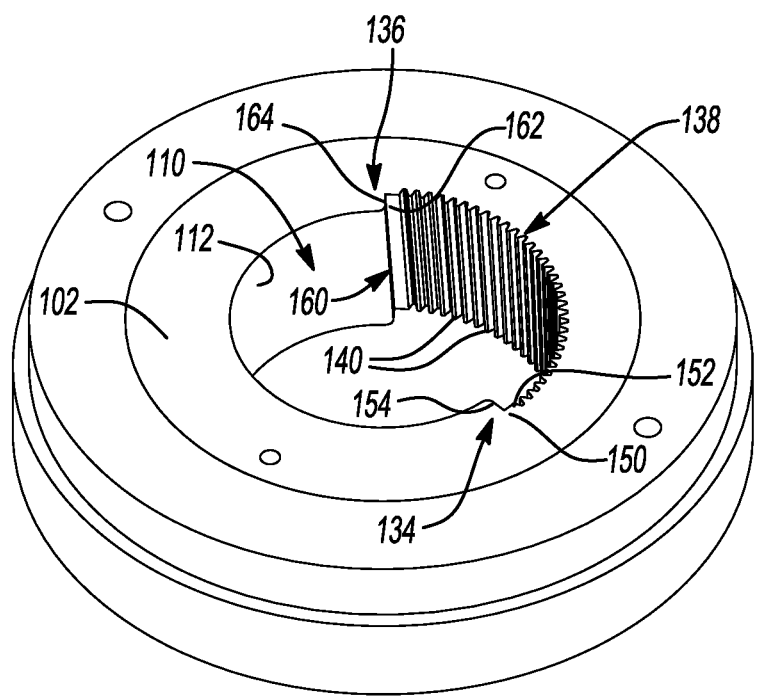
FIG. 8 is a perspective view of the die.

With reference to FIGS. 7 and 8, the die 102 has a die cavity 110 with an interior circumferential die surface 112 that is disposed about the central axis 24 and which defines a plurality of helical die teeth 130. The interior circumferential die surface 112 is configured to form the exterior circumferential surface 16 (FIG. 1) of the helical sector gear 10 (FIG. 1). The interior circumferential die surface 112 includes a first die spacing segment 134, a second die spacing segment 136 and a toothed die sector 138. The toothed die sector 138 is disposed circumferentially between the first and second die spacing segments 134 and 136 and includes all of the helical die teeth 130. Each of the helical die teeth 130 extends over a width of the die 102 and has a crest 140 that is spaced radially from the central axis 24 by the predetermined root dimension 42. The first die spacing segment 134 consists of a first helical die land 150 having a first circumferential die surface 152 and a first radial die surface 154. The first circumferential die surface 152 extends radially from the central axis 24 by the first dimension 56 (FIG. 1). The first radial die surface 154 extends radially inward from the first circumferential die surface 152 and has a first helical die contour (i.e., a flat plane warped in a helical manner) that conforms to a helix angle of the helical die teeth 130.

The second die spacing segment 136 consists of a second helical die land 160 having a second circumferential die surface 162 and a second radial die surface 164. The second circumferential die surface 162 extends radially from the central axis 24 by the second dimension 66. The second radial die surface 164 extends radially inward from the second circumferential die surface 162. The second radial die surface 164 has a second helical die contour (i.e., a flat plane warped in a helical manner) that conforms to the helix angle of the helical die teeth 130.

Figure 9:
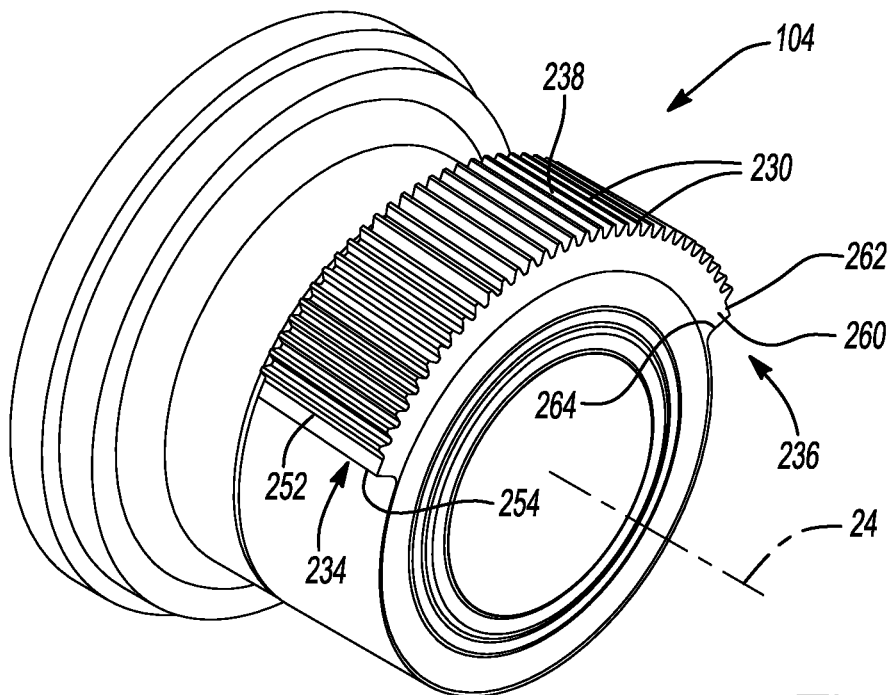
FIG. 9 is a bottom perspective view of a portion of the die set of FIG. 4, the view illustrating an upper punch assembly in greater detail.
Figure 10:
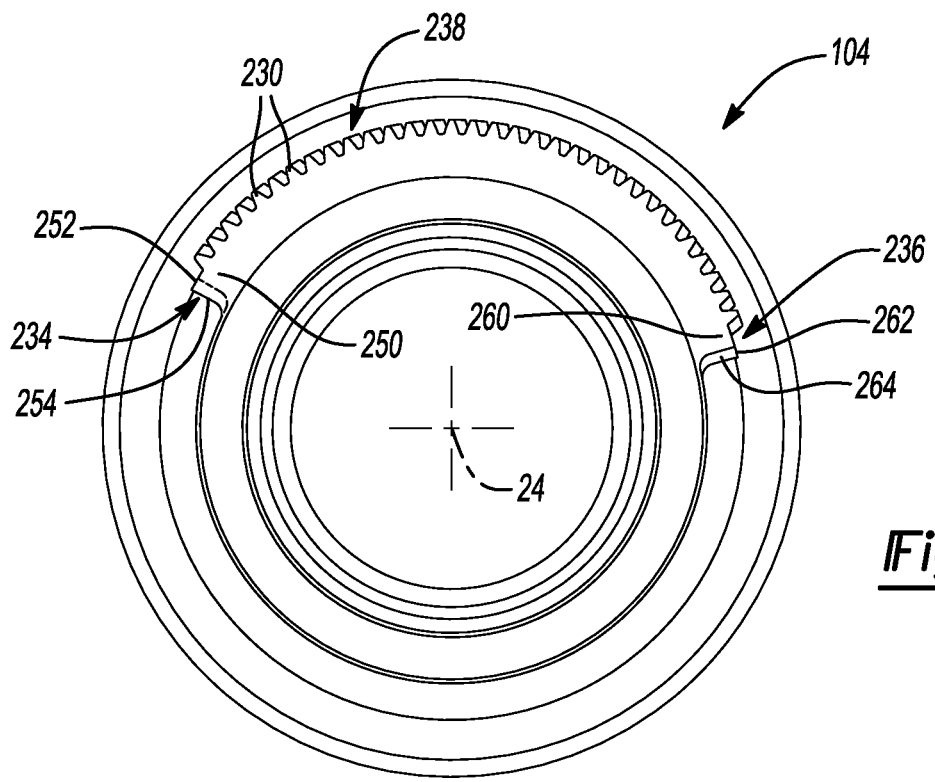
FIG. 10 is a bottom plan view of the upper punch assembly.

With reference to FIGS. 5, 9 and 10, the upper punch assembly 104 is configured to mate with the die 102 to form the first axial side 12 (FIG. 1) of the helical sector gear 10 (FIG. 1). The die includes a plurality of helical upper punch teeth 230 that are configured to matingly engage the die teeth 130 formed on the toothed die sector 138 of the die 102. The upper punch assembly 104 has a first upper punch spacing segment 234, which is configured to matingly engage with the first die spacing segment 134, a second upper punch spacing segment 236, which is configured to matingly engage with the second die spacing segment 136, and a toothed upper punch sector 238 having all of the helical upper punch teeth 230 formed thereon.

The first upper punch spacing segment 234 can consists of a first helical upper punch land 250 having a first circumferential upper punch surface 252 and a first radial upper punch surface 254. The first circumferential upper punch surface 252 extends radially from the central axis 24 by the first dimension 56 (FIG. 1). The first radial upper punch surface 254 extends radially inward from the first circumferential upper punch surface 252 and has a first helical upper punch contour (i.e., a flat plane warped in a helical manner) that conforms to a helix angle of the helical upper punch teeth 230.

Similarly, the second upper punch spacing segment 236 consists of a second helical upper punch land 260 having a second circumferential upper punch surface 262 and a second radial upper punch surface 264. The second circumferential upper punch surface 262 extends radially from the central axis 24 by the second dimension 66 (FIG. 1). The second radial upper punch surface 264 extends radially inward from the second circumferential upper punch surface 262 and has a second helical upper punch contour (i.e., a flat plane warped in a helical manner) that conforms to a helix angle of the helical upper punch teeth 230.

Figure 11:
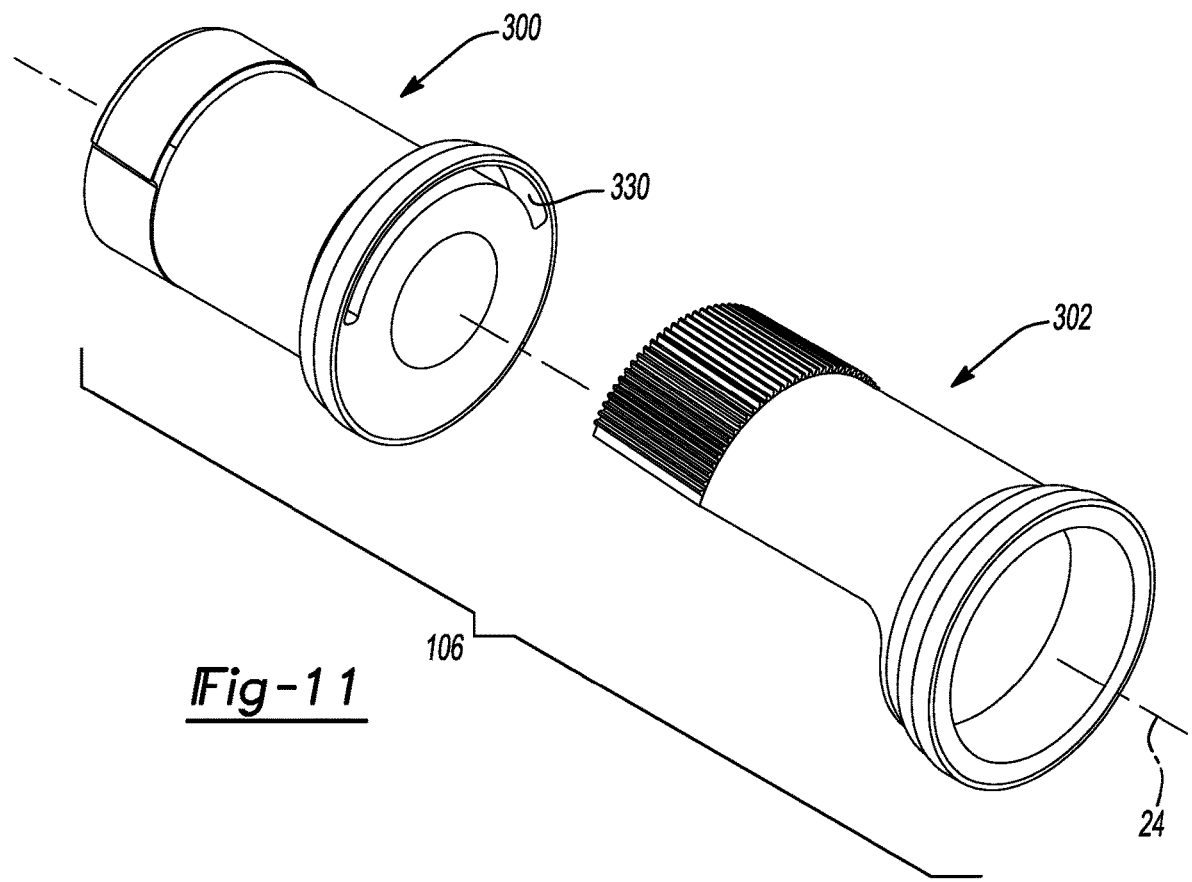
FIG. 11 is an exploded perspective view of a portion of the die set of FIG. 4, the view illustrating a lower punch assembly in greater detail.
Figure 12:
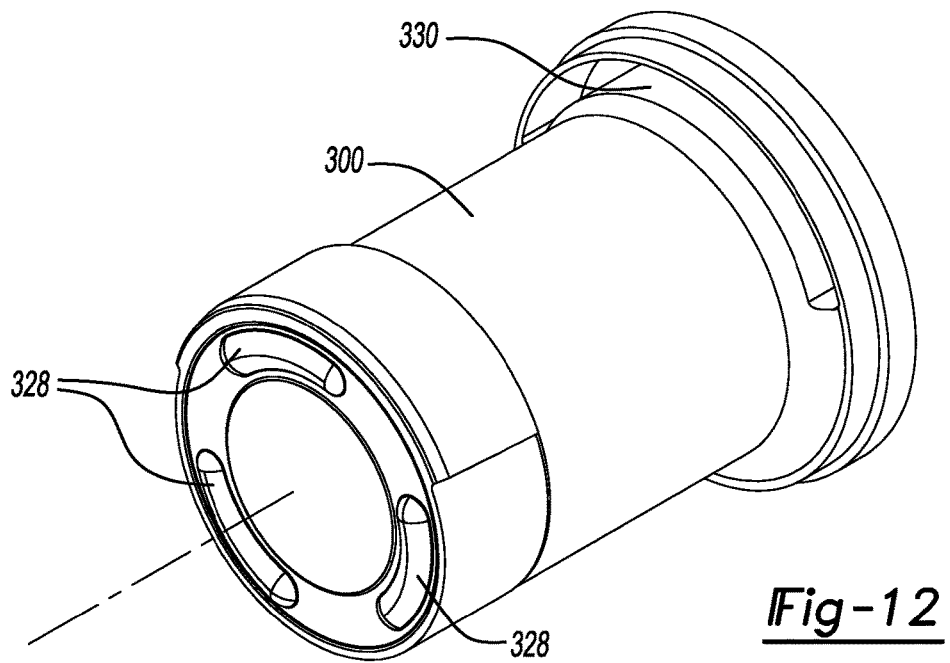
FIG. 12 is a top perspective view of a portion of the lower punch assembly, the view illustrating a body compacting portion in more detail.

With reference to FIGS. 6 and 11, the lower punch assembly 106 is configured to mate with the die 102 to form the second axial side 14 (FIG. 1) of the helical sector gear 10 (FIG. 1). The lower punch assembly 106 can have a body compacting portion 300 and a gear tooth compacting portion 302. In the example provided, the body compacting portion 300 is separate and distinct from the gear tooth compacting portion 302 so that the two portions can move along the central axis 24 relative to one another, but it will be appreciated that the lower punch assembly 106 could be formed such that the body compacting portion 300 and the gear tooth compacting portion 302 are fixedly coupled to one another (e.g., unitarily and integrally formed with one another). With additional reference to FIG. 12, the body compacting portion 300 can be configured to form the sector gear body 20 (FIG. 1) of the second axial side 14 (FIG. 1) of the helical sector gear 10 (FIG. 1). In the example provided, the body compacting portion 300 includes a plurality of circumferentially extending projections 328 that are configured to form the circumferentially extending grooves 28 (FIG. 1) in the helical sector gear 10 (FIG. 1).

The gear tooth compacting portion 302 can be formed onto or project axially from a sleeve or sleeve segment that can be disposed about the body compacting portion 300. In the example provided, the gear tooth compacting portion 302 extends through a slotted aperture 330 formed in the body compacting portion 300. The gear tooth compacting portion 302 can have a plurality of helical lower punch teeth 430 that are configured to matingly engage the helical die teeth 130 in the die 102.

Figure 13:
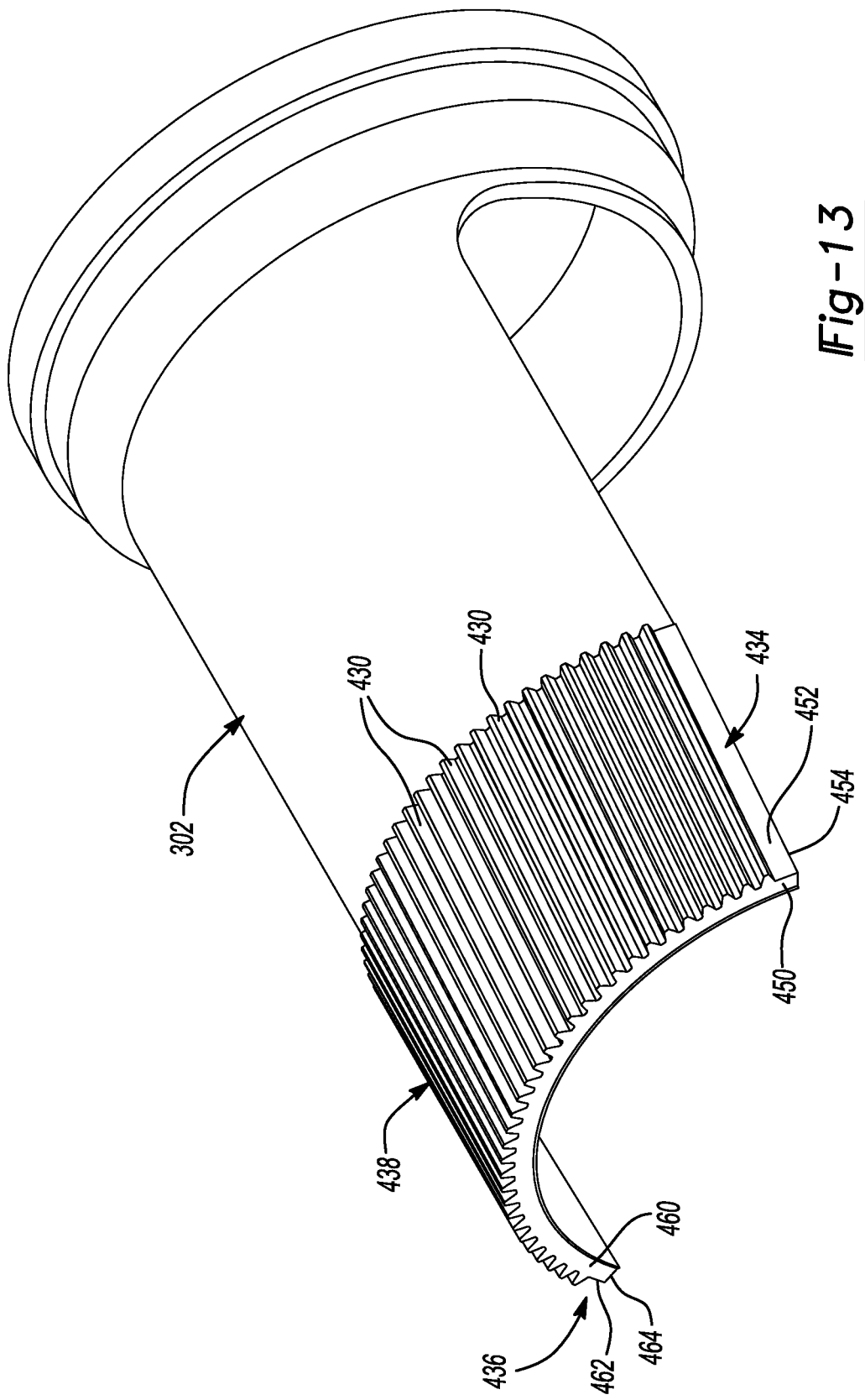
FIG. 13 is a top perspective view of a portion of the lower punch assembly, the view illustrating a gear tooth compacting portion in more detail.

With reference to FIG. 13, the gear tooth compacting portion 302 can include a first lower punch spacing segment 434, which is configured to matingly engage with the first die spacing segment 134, a second lower punch spacing segment 436, which is configured to matingly engage with the second die spacing segment 136, and a toothed lower punch sector 438 on which all of the having a plurality of helical lower punch teeth 430 formed thereon.

The first lower punch spacing segment 434 can consist of a first helical lower punch land 450 having a first circumferential lower punch surface 452 and a first radial lower punch surface 454. The first circumferential lower punch surface 452 extends radially from the central axis 24 by the first dimension 56 (FIG. 1). The first radial lower punch surface 454 extends radially inward from the first circumferential lower punch surface 452 and has a first helical lower punch contour (i.e., a flat plane warped in a helical manner) that conforms to a helix angle of the helical lower punch teeth 430.

Similarly, the second lower punch spacing segment 436 consists of a second helical lower punch land 460 having a second circumferential lower punch surface 462 and a second radial lower punch surface 464. The second circumferential lower punch surface 462 extends radially from the central axis 24 by the second dimension 66 (FIG. 1). The second radial lower punch surface 464 extends radially inward from the second circumferential lower punch surface 462 and has a second helical lower punch contour (i.e., a flat plane warped in a helical manner) that conforms to a helix angle of the helical lower punch teeth 430.

The core rod 108 can extend through the body compacting portion 300 and is configured to form the central aperture 26 (FIG. 1) in the helical sector gear 10 (FIG. 1). The core rod 108 may be configured to move along the central axis 24 with the body compacting portion 300 and/or the gear tooth compacting portion 302, but in the example provided, the core rod 108 is configured to move independently of both of the body compacting portion 300 and the gear tooth compacting portion 302.

With renewed reference to FIG. 4, one of the die 102, the upper punch assembly 104 and the gear tooth compacting portion 302 is non-rotatable about the central axis 24, while the other two of the die 102, the upper punch assembly 104 and the gear tooth compacting portion 302 are rotatable about the central axis 24. In the example provided, the die 102 and the upper punch assembly 104 are rotatable about the central axis 24, while the body compacting portion 300 and the gear tooth compacting portion 302 of the lower punch assembly 106 are maintained in a non-rotatable condition relative to the central axis 24. In this regard, a first bearing assembly 500 can be disposed between the upper punch assembly 104 and an upper ram 502 to permit the upper punch assembly 104 to rotate relative to the central axis 24, a second bearing assembly 504 can be disposed between the die 102 and a stationary die plate 506 to permit the die 102 to rotate relative to the central axis 24, the body compacting portion 300 of the lower punch assembly 106 can be maintained in a non-rotating condition relative to the central axis 24 and can be coupled to a first lower ram 508 for movement therewith along the central axis 24, and the gear tooth compacting portion 302 of the lower punch assembly 106 can be maintained in a non-rotating condition relative to the central axis 24 and can be coupled to a second lower ram 510, which can be disposed concentrically about the first lower ram 508, for movement therewith along the central axis 24.

In the operation of the die set 100, the upper punch assembly 104 can be fully retracted from the die 102 to permit access to the die cavity 110, the lower punch assembly 106 can be moved along the central axis 24 to a partly retracted position in which portions of both the body compacting portion 300 and the gear tooth compacting portion 302 are disposed in the die cavity 110 and engaged with associated portions of the interior circumferential die surface 112, and the core rod 108 can be disposed within the die cavity 110. An appropriate material can be loaded into the die cavity 110, such as a predetermined mass of a desired powdered metal material. Thereafter, the upper ram 502 and the first and second lower rams 508 and 510 may be operated to drive the upper punch assembly 104 and the lower punch assembly 106 into the die cavity 110. At an appropriate point in the operation of the die set 100 (e.g., during the loading of material into the die cavity 110, or prior to receipt of the upper punch assembly 104 in the die cavity 110), the core rod 108 can be received into a core rod aperture 520 that is formed into the upper punch assembly 104.

It will be appreciated that contact between the first and second upper punch spacing segments 234 and 236 (FIG. 10) and the first and second die spacing segments 134 and 136 (FIG. 7), respectively, can cause rotation of the upper punch assembly 104 relative to the die 102 when the upper punch assembly 104 is engaged to the die 102 and translated along the central axis 24. More specifically, contact between the first radial upper punch surface 254 (FIG. 10) and the first radial die surface 154 (FIG. 7), and contact between the second radial upper punch surface 264 (FIG. 10) and the second radial die surface 164 (FIG. 7) coordinates relative rotation between the upper punch assembly 104 and the die 102 as the upper punch assembly 104 travels along the central axis 24 relative to the die 102 while being engaged to the die 102.

Similarly, it will be appreciated that contact between the contact between the first and second lower punch spacing segments 434 and 436 (FIG. 13) and the first and second die spacing segments 134 and 136 (FIG. 7), respectively, can cause rotation of the die 102 relative to the gear tooth compacting portion 302 when the gear tooth compacting portion 302 is translated along the central axis 24. More specifically, contact between the first radial lower punch surface 454 (FIG. 13) and the first radial die surface 154 (FIG. 7), and contact between the second radial lower punch surface 464 (FIG. 13) and the second radial die surface 164 (FIG. 7) coordinates relative rotation between the die 102 and the gear tooth compacting portion 302 as the gear tooth compacting portion 302 travels along the central axis 24 relative to the die 102 while being engaged to the die 102.

The upper ram 502 and the first and second lower rams 508 and 510 can be translated toward one another to compact the powdered metal in the die cavity 110 between the upper and lower punch assemblies 104 and 106 to a desired extent and thereby form the helical sector gear 10 (FIG. 1). Thereafter the upper punch assembly 104 can be fully retracted from the die cavity 110 and the helical sector gear 10 (FIG. 1) can be ejected from the die cavity 110 (e.g., by translating the lower punch assembly 106 along the central axis 24 toward the upper punch assembly 104 when the upper punch assembly 104 has been or is being retracted from the die cavity 110). Thereafter, the helical sector gear 10 (FIG. 1) can be subjected to one or more post-consolidation processes, including sintering or any desired machining or heat treating process.

Those of skill in the art will appreciate that while the helical teeth 30 (FIG. 1) are net-formed in the particular example provided, the teachings of the present disclosure are not so limited and cover instances where the helical sector gear is formed with helical teeth that are near net-formed and finished in one or more processes, such as machining or grinding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A die set for forming a helical sector gear, the die set comprising:
   a die having a die cavity with an interior circumferential die surface that is disposed about a central axis, the interior circumferential die surface being configured to form an exterior circumferential surface of the helical sector gear, the interior circumferential die surface including a first die spacing segment, a second die spacing segment and a toothed die sector, the toothed die sector being disposed circumferentially between the first and second die spacing segments and defining a plurality of helical die teeth, each of the helical die teeth extending over a width of the die and having a root that is spaced radially from the central axis by a predetermined root dimension, the first die spacing segment consisting of a first helical die land having a first circumferential die surface and a first radial die surface, the first circumferential die surface extending radially from the central axis by a first dimension, the first radial die surface extending radially inward from the first circumferential die surface, the first radial die surface having a first helical die contour that conforms to a helix angle of the helical die teeth, the second die spacing segment consisting of a second helical die land having a second circumferential die surface and a second radial die surface, the second circumferential die surface extending radially from the central axis by a second dimension, the second radial die surface extending radially inward from the second circumferential die surface, the second radial die surface having a second helical die contour that conforms to the helix angle of the helical die teeth;
   an upper punch assembly that is configured to mate with the die to form a first axial end of the helical sector gear, the upper punch assembly having a first upper punch spacing segment, which is configured to matingly engage with the first die spacing segment, a second upper punch spacing segment, which is configured to matingly engage with the second die spacing segment, and a toothed upper punch sector that is configured to matingly engage the toothed die sector; and
   a lower punch assembly that is configured to mate with the die to form a second axial end of the helical sector gear, the lower punch assembly having a gear tooth compacting portion with a first lower punch spacing segment, which is configured to matingly engage with the first die spacing segment, a second lower punch spacing segment, which is configured to matingly engage with the second die spacing segment, and a toothed lower punch sector that is configured to matingly engage the toothed die sector;
   wherein one of the die, the upper punch assembly and the gear tooth compacting portion is non-rotatable about the central axis and wherein the other two of the die, the upper punch assembly and the gear tooth compacting portion are rotatable about the central axis.

2. The die set of claim 1, wherein the lower punch assembly includes a body compacting portion that is disposed radially inwardly of the gear tooth compacting portion and wherein the gear tooth compacting portion is movable along the central axis relative to the body compacting portion.

3. The die set of claim 1, wherein the upper punch assembly and the die are the other two of the die, the upper punch assembly and the gear tooth compacting portion that are rotatable about the central axis.

4. A method for forming a helical sector gear, the method comprising:
   providing a die having a die cavity with an interior circumferential die surface that is disposed about a central axis, the interior circumferential die surface being configured to form an exterior circumferential surface of the helical sector gear, the interior circumferential die surface including a first die spacing segment, a second die spacing segment and a toothed die sector, the toothed die sector being disposed circumferentially between the first and second die spacing segments and defining a plurality of helical die teeth, each of the helical die teeth extending over a width of the die and having a root that is spaced radially from the central axis by a predetermined root dimension, the first die spacing segment consisting of a first helical die land having a first circumferential die surface and a first radial die surface, the first circumferential die surface extending radially from the central axis by a first dimension, the first radial die surface extending radially inward from the first circumferential die surface, the first radial die surface having a first helical die contour that conforms to a helix angle of the helical die teeth, the second die spacing segment consisting of a second helical die land having a second circumferential die surface and a second radial die surface, the second circumferential die surface extending radially from the central axis by a second dimension, the second radial die surface extending radially inward from the second circumferential die surface, the second radial die surface having a second helical die contour that conforms to the helix angle of the helical die teeth;
   providing an upper punch assembly that is configured to mate with the die to form a first axial end of the helical sector gear, the upper punch assembly having a first upper punch spacing segment, which is configured to matingly engage with the first die spacing segment, a second upper punch spacing segment, which is configured to matingly engage with the second die spacing segment, and a toothed upper punch sector that is configured to matingly engage the toothed die sector;

providing a lower punch assembly that is configured to mate with the die to form a second axial end of the helical sector gear, the lower punch assembly having a gear tooth compacting portion with a first lower punch spacing segment, which is configured to matingly engage with the first die spacing segment, a second lower punch spacing segment, which is configured to matingly engage with the second die spacing segment, and a toothed lower punch sector that is configured to matingly engage the toothed die sector;

loading the die cavity with a predetermined amount of a powdered metal material;

compacting the powdered metal material in the die cavity between the upper punch assembly and the lower punch assembly, wherein one of the die, the upper punch assembly and the gear tooth compacting portion is non-rotatable about the central axis when the powdered metal material is compacted in the die, and wherein the other two of the die, the upper punch assembly and the gear tooth compacting portion are rotatable about the central axis when the powdered metal material is compacted in the die.

5. The method of claim 4, wherein a plurality of circumferential grooves are formed into an axial end of the helical sector gear when the powdered metal material is compacted in the die.

6. The method of claim 5, wherein the upper punch assembly and the die are the other two of the die, the upper punch assembly and the gear tooth compacting portion that are rotatable about the central axis.

* * * * *